2,970,080
INSECTICIDE FORMULATIONS

Nicholas R. Oros, Trenton, and Richard D. Vartanian, Bound Brook, N.J., assignors to American Cyanamid Company, New York, N.Y., a corporation of Maine No Drawing. Filed Apr. 29, 1959, Ser. No. 809,614

6 Claims. (Cl. 167—22)

This invention relates to insecticidal compositions and more particularly is concerned with improved dry formulations of certain organic phosphate insecticides stabilized by the addition of certain polyalkylene glycol deactivators.

Powdered and granular solid carriers, such as attapulgite type clays, are commonly used in formulating agricultural chemicals such as insecticides, herebicides and fungicides. The amount of active ingredient may be from 1 to 50 parts per 100 parts of clay, the lower concentrations being formulated for use as finished dusts; the higher concentrations being formulated either as wettable powders or dust concentrates for further dilution with less sorptive carriers.

It has been found that the carriers generally used with organic phosphate insect toxicants exert a chemical breakdown on the toxicant which has the effect of degrading or decomposing the toxicant when intimately mixed therewith. While this degrading action is a slow process, it is significant and troublesome since dry formulations are often prepared as concentrates or even field strength materials and then stored for periods which may be as long as a year or more. During this storage period the effect of the carrier or diluent on the insect toxicant inngredient may reduce its effectiveness to the point where satisfactory insect control under field conditions is no longer obtainable.

Although the exact mechanism for this breakdown is unknown it is believed to be a surface phenomenon related to localized basic spots on the clay commonly known as "hot" spots. This chemical breakdown is particularly noticeable with respect to certain specific systemic insecticides such as certain phosphoro-dithioates and certain N-alkyl-substituted carbamoyldimethylphosphorodithioates.

The present invention is based upon the discovery that the solid carriers of the class consisting of kaolin clays, montmorillonite clays, and attapulgite clays which are active in deteriorating certain organic phosphate insecticides described more particularly hereinafter can be rendered substantially inert by the addition thereto of certain polyalkylene glycols which serve as deactivators.

In accordance with the present invention an amount of organic phosphate insecticide ranging from about 1% to about 30% is incorporated on or in a clay of the class described. There is added thereto from about 1% to about 20% of a specified polyalkylene glycol based on the weight of the clay which markedly improves the stability of the insecticide on the granular clay. Thus, for the first time there is provided a cheap, stable form of a systemic insecticide which has considerable economic advantages.

It is an advantage of the present invention that the polyalkylene glycol and the organic phosphate compound are mutually compatible. Not only is this of great importance from a processing cost point of view but it permits a low level of polyalkylene g'ycol to be used. Thus, instead of attempting to cover indiscriminately each "hot" spot, the present method prevents intimate contact of the insecticide with the "hot" spot by being concurrently present therewith and thus neutralizing or stopping any chemical or physical interaction between the "hot" spot and the insecticide.

Suitable deactivators for use in the present invention are certain polyalkylene glycols, e.g., ethylene glycol, propylene glycol, butylene glycol, diethylene glycol, triethylene glycol, polyethylene glycol, etc.

The organic phosphate insecticides contemplated for use in the toxic formulations of the present invention are those phosphorodithioates represented by the general formula:

(I)

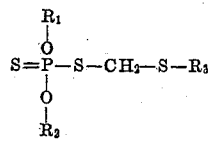

wherein $R_1$, $R_2$ and $R_3$ are lower alkyl radicals of not more than 4 carbon atoms. A particularly preferred compound for use in the present invention is O,O-diethyl S-(ethylthiomethyl) phosphorodithioate.

The other general class of insect toxicants useful in the formulations of the present invention are those N-alkyl-substituted c a r b a m o y l dimethylphosphhorodithioates which may be represented by the general formula:

(II)          Alk-NHCOCH$_2$SSP(OCH$_3$)$_2$ wherein Alk is methyl, ethyl, n-propyl, i-propyl and t-butyl.

The invention will be described in greater detail in conjunction with the following specific examples in which the parts are by weight unless otherwise specified.

Example 1

4.3 parts by weight of triethylene glycol and 8.9 parts of O,O-diethyl S-(ethylthiomethyl) phosphorodithioate (8 parts real) were intimately mixed and sprayed on 86.8 parts of attapulgite granu'ar (RVM 24/48 mesh). The resulting free-flowing granules were found to have an initial assay of 7.99% O,O-diethyl S-(ethylthiomethyl) phosphorodithioate. After storage at room temperature for 6 months the assay was 7.84% equivalent to a 1.9% loss. A sample stored at 40° C. for 6 months assayed 6.72% equivalent to a 15.7% loss.

A control sample without a deactivator had an initial assay of 8.08% O,O-diethyl S-(ethylthiomethyl) phosphorodithioate. After storage at room temperature for 6 months the assay was 3.71% equivalent to a 54.0% loss. A sample stored at 40° C. for 6 months assayed 3.31% equivalent to a 59.0% loss.

Examples 2-3

Other samples were prepared in a manner similar to that shown in Example 1. The results obtained are shown below:

| Deactivator | Initial Assay | Assay at 6 mos. | | Percent loss, 6 mos. | |
|---|---|---|---|---|---|
| | | R.T. | 40° C. | R.T. | 40° C. |
| Polyethylene glycol "still bottom" | 8.07 | 7.26 | 6.31 | 10.0 | 22.0 |
| Diethylene glycol | 7.88 | 7.68 | 2.0 | 6.26 | 20.5 |

Example 4

4.3 parts by weight of diethylene glycol and 8.9 parts actual (9.2 as is) by weight of S-(N-methylcarbamolymethyl) O,O-dimethylphosphorodithioate were dissolved in 9 parts of benzene and sprayed on 86 8 parts of attapulgite granular (RVM 24/48 mesh). The excess benzene was then removed by evaporation.

After storage for several months at 40° C. the analysis showed approximately a 20% loss. In a similar experiment a control sample without deactivator showed approximately a 50% loss.

We claim:

1. A stabilized insecticidal composition comprising a finely-divided solid carrier selected from the group consisting of kaolin clays, montmorillonite clays and attapulgite clays and an organic phosphate insect toxicant selected from the group consisting of those compounds represented by the formula:

(I) 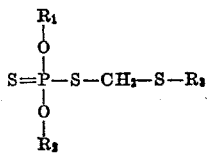

wherein $R_1$, $R_2$ and $R_3$ are lower alkyl radicals of not more than 4 carbon atoms and those compounds represented by the formula:

(II) 

wherein Alk is an alkyl radical selected from the group consisting of methyl, ethyl, n-propyl, i-propyl and t-butyl and an effective amount of a polyalkylene glycol to prevent deactivation of said toxicant by said carrier, said polyalkylene glycol being selected from the group consisting of ethylene glycol, propylene glycol, butylene glycol, diethylene glycol, triethylene glycol and polyethylene glycol and being present to the extent of from about 1 to about 20% based on the weight of the carrier.

2. A composition according to claim 1 in which the polyalkylene glycol is diethylene glycol.

3. A composition according to claim 1 in which the polyalkylene glycol is triethylene glycol.

4. A composition according to claim 1 in which the polyalkylene glycol is polyethylene glycol.

5. A composition according to claim 1 in which the insect toxicant is O,O-diethyl S-(ethylthiomethyl) phosphorodithioate.

6. A composition according to claim 1 in which the insect toxicant is S-(N-methylcarbamoylmethyl) O,O-dimethylphosphorodithioate.

References Cited in the file of this patent

UNITED STATES PATENTS

| | | |
|---|---|---|
| 2,596,076 | Hook | May 6, 1952 |
| 2,631,962 | Moore | Mar. 17, 1953 |
| 2,832,716 | Cassil | Apr. 29, 1958 |
| 2,927,882 | Trademan | Mar. 8, 1960 |